(12) United States Patent
Reese et al.

(10) Patent No.: US 11,446,859 B2
(45) Date of Patent: Sep. 20, 2022

(54) METHOD OF PREPARING POROUS SILICONE ARTICLE AND USE OF THE SILICONE ARTICLE

(71) Applicant: DOW SILICONES CORPORATION, Midland, MI (US)

(72) Inventors: Herschel Henry Reese, Midland, MI (US); Bizhong Zhu, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 131 days.

(21) Appl. No.: 16/498,985

(22) PCT Filed: Mar. 30, 2018

(86) PCT No.: PCT/US2018/025345
§ 371 (c)(1),
(2) Date: Sep. 27, 2019

(87) PCT Pub. No.: WO2018/183803
PCT Pub. Date: Oct. 4, 2018

(65) Prior Publication Data
US 2020/0324464 A1 Oct. 15, 2020

Related U.S. Application Data

(60) Provisional application No. 62/478,991, filed on Mar. 30, 2017.

(51) Int. Cl.
*B29C 64/124* (2017.01)
*B33Y 10/00* (2015.01)
*B33Y 80/00* (2015.01)

(52) U.S. Cl.
CPC .............. *B29C 64/124* (2017.08); *B33Y 10/00* (2014.12); *B33Y 80/00* (2014.12)

(58) Field of Classification Search
CPC ....... B33Y 80/00; B33Y 10/00; B29C 64/124; B29C 64/153
See application file for complete search history.

(56) References Cited

U.S. PATENT DOCUMENTS

2014/0356585 A1 12/2014 Duoss et al.
2017/0312981 A1* 11/2017 Selbertinger .......... B33Y 70/00
(Continued)

FOREIGN PATENT DOCUMENTS

WO 2014193984 A1 12/2014
WO 2016019434 A1 2/2016
(Continued)

OTHER PUBLICATIONS

International Search Report for PCT/US2018/025345 dated Jul. 20, 2018, 4 pages.
(Continued)

*Primary Examiner* — Larry W Thrower
(74) *Attorney, Agent, or Firm* — Warner Norcross + Judd LLP

(57) ABSTRACT

A method of forming a porous three-dimensional (3D) silicone article is disclosed. The method comprises I) printing a first composition with a 3D printer to form a first layer from the first composition. The method further comprises II) printing a second composition on the first layer with the 3D printer to form a second layer from the second composition on the first layer. At least one of the first and second compositions comprises a silicone composition. In the method, step II) may optionally be repeated with independently selected composition(s) for any additional layer(s). At least one of the first and second layers does not consist of linear filaments. Finally, the method comprises III) exposing the layers to a solidification condition. The porous three-dimensional (3D) silicone article defines a plurality of voids.

6 Claims, 2 Drawing Sheets

(56) References Cited

U.S. PATENT DOCUMENTS

2018/0071979 A1\* 3/2018 Achten .................. B33Y 10/00
2018/0186121 A1 7/2018 Duoss et al.

FOREIGN PATENT DOCUMENTS

WO 2016071241 A1 5/2016
WO 2017040874 A1 3/2017

OTHER PUBLICATIONS

Lewis, Jennifer A., "Direct Ink Writing of 3D Functional Materials", Adv. Funct. Mater. 2006, 16, 2193-2204.
Maiti et al., "3D printed cellular solid outperforms traditional stochastic foam in long-term mechanical response", Scientific Reports, Apr. 27, 2016, 6:24871.
Weisgraber et al., "Compression simulations of silicone cellular solids with ordered and stochastic micro-structures", From Abstracts of Papers, 248th ACS National Meeting & Exposition, San Francisco, CA, United States, Aug. 10-14, 2014 (2014), PMSE-450.
Lewicki et al., "Manufacture and characterization of multifunctional silicone architectures", From Abstracts of Papers, 250th ACS National Meeting & Exposition, Boston, MA, United States, Aug. 16-20, 2015 (2015), POLY-76.

\* cited by examiner

METHOD OF PREPARING POROUS SILICONE ARTICLE AND USE OF THE SILICONE ARTICLE

CROSS-REFERENCE TO RELATED APPLICATIONS

This application is the National Stage of International Application No. PCT/US2018/025345 filed on 30 Mar. 2018, which claims priority to and all advantages of U.S. Application No. 62/478,991 filed on 30 Mar. 2017, the contents of which are hereby incorporated by reference.

FIELD OF THE INVENTION

The present invention generally relates to a method of preparing a three-dimensional (3D) silicone article and, more specifically, to a method of preparing a porous 3D silicone article with a 3D printer and to the porous 3D silicone article formed thereby.

DESCRIPTION OF THE RELATED ART 3D printing or additive manufacturing (AM) is a process of making three-dimensional (3D) solid objects, typically from a digital file. The creation of a 3D printed object is achieved using additive processes rather than subtractive processes. In an additive process, an object is created by laying down successive layers of material until the entire object is created. Each of these layers can be seen as a thinly sliced horizontal cross-section of the eventual object.

Additive processes have been demonstrated with certain limited types of materials, such as organic thermoplastics (e.g. polylactic acid (PLA) or acrylonitrile butadiene styrene (ABS)), plaster, clay, room temperature vulcanization (RN) materials, paper, or metal alloys. These materials are unsuitable in certain end applications based on physical or chemical limitations, cost, slow solidification (or cure) times, improper viscosity, etc.

SUMMARY OF THE INVENTION

The present invention provides a method of forming a porous three-dimensional (3D) silicone article. The method comprises I) printing a first composition with a 3D printer to form a first layer from the first composition. The method further comprises II) printing a second composition on the first layer with the 3D printer to form a second layer from the second composition on the first layer. At least one of the first and second compositions comprises a silicone composition. In the method, step II) may optionally be repeated with independently selected composition(s) for any additional layer(s). At least one of the first and second layers does not consist of linear filaments. Finally, the method comprises III) exposing the layers to a solidification condition. The porous three-dimensional (3D) silicone article defines a plurality of voids.

The present invention also provides the porous 3D silicone article formed in accordance with the method.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
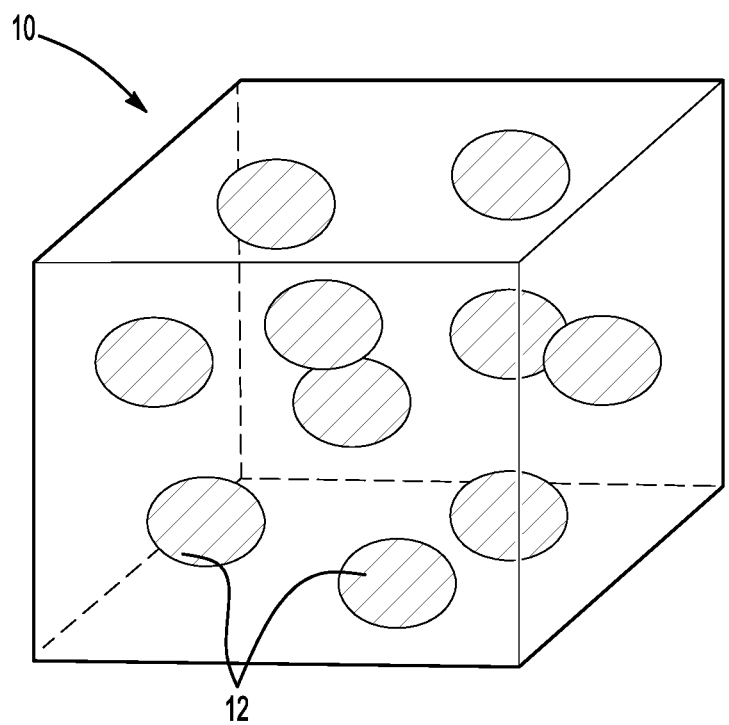
FIG. 1 is a schematic view of a porous 3D article formed via one embodiment of the inventive method.

The present invention provides a method of forming a porous three-dimensional (3D) silicone article, which defines a plurality of voids. The porous 3D silicone article is formed with independently selected compositions, which are described below, along with various aspects relating to the porous 3D silicone article formed in accordance with the inventive method. The porous 3D silicone article may be customized for myriad end use applications and industries. For example, as described below, the porous 3D silicone article may be a compressible foam utilized in cushion and support applications. Alternatively or in addition, the porous 3D silicone article may be a rigid foam utilized in construction applications. Further still, the porous 3D silicone article may be utilized in biological and/or health care applications in view of the excellent compatibility between silicones and biological systems.

This disclosure generally incorporates by reference in its entirety ASTM Designation F2792-12a, "Standard Terminology for Additive Manufacturing Technologies." Under this ASTM standard, "3D printer" is defined as "a machine used for 3D printing" and "3D printing" is defined as "the fabrication of objects through the deposition of a material using a print head, nozzle, or another printer technology". "Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication". AM may also be referred to as rapid prototyping (RP). As used herein, "3D printing" is generally interchangeable with "additive manufacturing" and vice versa.

The method of this disclosure can mimic any one of the aforementioned 3D printing processes, or other 3D printing processes understood in the art. Specific examples of suitable 3D printing processes are also described in U.S. Pat. Nos. 5,204,055 and 5,387,380, the disclosures of which are incorporated herein by reference in their respective entireties.

3D printing is generally associated with a host of related technologies used to fabricate physical objects from computer generated data sources. Some of these specific processes are included above with reference to specific 3D printers. Further, some of these processes, and others, are described in greater detail below.

In general, 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however, other file formats can also or additionally be used. The file is generally read into 3D printing software, which takes the file and optionally user input to separate it into hundreds, thousands or even millions of "slices". The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

The nozzle and/or build platform generally moves in the X-Y (horizontal) plane before moving in the Z-axis (vertical) plane once each layer is complete. In this way, the object which becomes the porous 3D silicone article is built one layer at a time from the bottom upwards. This process can use material for two different purposes, building the object and supporting overhangs in order to avoid extruding material into thin air.

In various embodiments, the method of this disclosure mimics a conventional material jetting process. Material jetting printers often resemble traditional paper printers, e.g. inkjet printers. In material jetting, a print head moves around a print area jetting the particular composition. Repeating this process builds up the object one layer at a time.

Optionally, the resulting objects may be subjected to different post-processing regimes, such as further heating, solidification, infiltration, bakeout, and/or firing. This may be done, for example, to expedite cure of any binder, to reinforce the porous 3D silicone article, eliminate any curing/cured binder (e.g., by decomposition), to consolidate the core material (e.g., by sintering/melting), and/or to form a composite material blending the properties of powder and binder.

The method comprises the step of I) printing a first composition with a 3D printer to form a first layer from the first composition. Various types of 3D printers and/or 3D printing methodologies (i.e., "3D printing processes") can be utilized, as described in detail below. As also described below, various types of compositions can be utilized in the inventive method, which may be the same as or different from one another and are independently selected. The first composition may be curable or otherwise capable of solidification upon application of a solidification condition, as described below in regards to suitable compositions for use in the method.

In various embodiments, the method of this disclosure mimics a conventional material extrusion process. Material extrusion generally works by extruding material (in this case, the first composition) through a nozzle to print one cross-section of an object, which may be repeated for each subsequent layer. The nozzle may be heated, cooled or otherwise manipulated during printing, which may aid in dispensing the particular composition.

The first composition is generally printed on a substrate such that the first layer is formed on the substrate. The substrate is not limited and may be any substrate. The substrate typically can support the porous 3D silicone article during its method of forming. However, the substrate may itself be supported, e.g. by a table, such that the substrate itself need not have rigidity. The substrate may be rigid or flexible, and may be discontinuous or continuous in at least one of thickness and composition. The substrate may include a coating or other film disposed thereon, and the substrate may be removable, e.g. peelable, from the porous 3D silicone article. Alternatively, the porous 3D silicone article may physically and/or chemically bond to the substrate such that the porous 3D silicone article and the substrate are integral together. In one embodiment, the substrate may comprise a silicone substrate, e.g. an already cured silicone, such that the substrate becomes integral with the porous 3D silicone article. The substrate may be a mold or any other object or article. However, depending on a selection of the first composition, the substrate is optional. For example, the first layer may have sufficient viscosity or rigidity such that the first layer is formed suspended in situ as the first composition is dispensed from the 3D printer, in which case the first layer is separate from and not in contact with any substrate.

Ambient conditions may be manipulated or controlled during printing. For example, if desired, the substrate may be heated, cooled, mechanically vibrated, or otherwise manipulated before, during, and/or after the steps of printing to assist with solidification and/or curing. Further, the substrate could be moved, e.g. rotated, during any printing step. Similarly, the dispenser may be heated or cooled before, during, and after dispensing the first composition. More than one dispenser may be utilized with each dispenser having independently selected properties or parameters. The method may be carried out in a heated and/or humidified environment such that solidification and/curing initiates after each step of printing.

The first layer formed by printing the first composition may have any shape and dimension. For example, the first layer need not be continuous, as in a conventional layer. The first layer need not have a consistent thickness. Depending on a desired shape of the porous 3D silicone article formed by the method, the first layer may take any form.

For example, the first layer may comprise a film, which may be continuous or discontinuous in its dimensions, including thickness.

Alternatively or in addition, the first layer may comprise a first filament, alternatively a plurality of filaments. The first filament, or plurality of filaments, of the first layer is referred to herein merely as the first filament for purposes of clarity, which extends to and encompasses a single filament or a plurality of filaments, which may be independently selected and formed in the first layer. The first filament may be randomized, patterned, linear, non-linear, woven, non-woven, continuous, discontinuous, or may have any other form or combinations of forms. For example, the first filament may be a mat, a web, or have other orientations. The first filament may be patterned such that the first layer comprises the first filament in a nonintersecting manner. For example, the first filament may comprise a plurality of linear and parallel filaments or strands. Alternatively, the first filament may intersect itself such that the first layer itself comprises a patterned or cross-hatched filament. The pattern or cross-hatching of the first filament may present perpendicular angles, or acute/obtuse angles, or combinations thereof, at each intersecting point of the first filament, which orientation may be independently selected at each intersecting point. In certain embodiments, the first filament may fuse with itself to define a void, alternatively a plurality of voids, in the first layer.

In specific embodiments, the first layer may be formed in accordance with the method disclosed in U.S. Application Ser. No. 62/479,016, which is filed herewith and incorporated by reference herein in its entirety.

Alternatively or in addition, the first layer may comprise fused droplets formed from the first composition. The fused droplets may be independently sized and selected and may have any desired deposition pattern, e.g. the fused droplets may contact one another, may be spaced from one another, may be at least partially overlapping, etc. Another form of the first layer formed from the first composition includes fused powders. The fused powders may be independently sized and selected and may have any desired deposition pattern.

Additional aspects of the method are introduced below, followed by further description associated with the first composition, other suitable compositions, and the porous 3D silicone article itself.

The method further comprises II) printing a second composition on the first layer with the 3D printer to form a second layer from the second composition on the first layer. The second layer may only contact a portion of an exposed surface of the first layer. For example, depending on the desired shape of the porous 3D silicone article, the second layer may build on the first layer selectively.

The second composition may be the same as or different from the first composition utilized to form the first layer. At least one of the first and second compositions comprises a silicone composition, as described in further detail below. Any description above relative to I) printing the first composition to form the first layer is also applicable to II) printing the second composition on the first layer to form the second layer, and each aspect of each printing step is independently selected. As described in greater detail below, the method may optionally comprise repeating step II) with independently selected composition(s) for any additional layer(s). The first layer, second layer (or subsequent or latter layer), and any additional layer(s), optionally included as described below, are referred to collectively herein as "the layers." "The layers," as used herein in plural form, may relate to the layers at any stage of the inventive method, e.g. in an unsolidified and/or uncured state, in a partially solidified and/or partially cured state, in a solidified or a final cure state, etc. Generally, any description below relative to a particular layer is also applicable to any other layer, as the layers are independently formed and selected.

Finally, the method comprises III) exposing the layers to a solidification condition. The solidification condition may be any condition which contributes to solidification of the layers. For example, solidification may be a result of curing or increasing a crosslink density of the layers. Alternatively, solidification may be the result of a physical change within a layer, e.g. drying or removing any vehicle which may be present in any of the composition(s) and/or corresponding layer(s), as described below with respect to suitable compositions. Because each layer is independently selected, the solidification condition may vary for each layer.

Depending on a selection of the particular composition, as described below, the solidification condition may be selected from: (i) exposure to moisture; (ii) exposure to heat; (iii) exposure to irradiation; (iv) reduced ambient temperature; (v) exposure to solvent; (vi) exposure to mechanical vibration; or (vii) any combination of (i) to (vi). The solidification condition typically at least partially solidifies, alternatively solidifies, the layers.

The layers may be exposed to the solidification condition at any time in the method, and exposure to the solidification condition need not be delayed until two or more layers are formed in the method. For example, they layers may be exposed to the solidification individually and/or collectively. Specifically, the first layer may be exposed to the solidification condition to at least partially solidify the first layer prior to forming the second layer thereon. In these embodiments, exposing the first layer to the solidification condition forms an at least partially solidified first layer such that II) is further defined as II) printing the second composition on the at least partially solidified first layer. Similarly, the second layer may be at least partially solidified prior to repeating any printing steps for additional layers. The layers may also be subjected or exposed to a solidification condition when in contact with one another, even if these layers were at least partially solidified iteratively prior to each printing step.

At least partial solidification of the layer is generally indicative of cure; however, cure may be indicated in other ways, and solidification may be unrelated to curing. For example, curing may be indicated by a viscosity increase, e.g. bodying of the layer, an increased temperature of the layer, a transparency/opacity change of the layer, an increased surface or bulk hardness, etc. Generally, physical and/or chemical properties of the layer are modified as each layer at least partially solidifies to provide the at least partially solidified layers, respectively.

In certain embodiments, "at least partially solidified" means that the particular at least partially solidified layer substantially retains its shape upon exposure to ambient conditions. Ambient conditions refer to at least temperature, pressure, relative humidity, and any other condition that may impact a shape or dimension of the at least partially solidified layer. For example, ambient temperature is room temperature. Ambient conditions are distinguished from solidification conditions, where heat (or elevated temperature) is applied. By "substantially retains its shape," it is meant that a majority of the at least partially solidified layer retains its shape, e.g. the at least partially solidified layer does not flow or deform upon exposure to ambient conditions. Substantially may mean that at least about 50%, 60%, 70%, 80%, 90%, 95%, 96%, 97%, 98%, 99%, 99.5%, 99.9%, 99.99%, or at least about 99.999% or more of the volume of the at least partially solidified layer is maintained in the same shape and dimension over a period of time, e.g. after 1 minute, 5 minutes, 10 minutes, 30 minutes, 1 hour, 4 hours, 8 hours, 12 hours, 1 day, 1 week, 1 month, etc. Said differently, substantially retaining shape means that gravity does not substantially impact shape of the at least partially solidified layer upon exposure to ambient conditions. The shape of the at least partially solidified layer may also impact whether the at least partially solidified layer substantially retains its shape. For example, when the at least partially solidified layer is rectangular or has another simplistic shape, the at least partially solidified layer may be more resistant to deformation at even lesser levels of solidification than at least partially solidified layers having more complex shapes.

More specifically, prior to exposing one or more layers to the solidification condition, the first composition (as well as the second composition and any subsequent compositions) is generally flowable and may be in the form of a liquid, slurry, or gel, alternatively a liquid or slurry, alternatively a liquid. Viscosity of each composition can be independently adjusted depending on the type of 3D printer and its dispensing technique or other considerations. Adjusting viscosity can be achieved, for example, by heating or cooling any of the compositions, adjusting molecular weight of one or more components thereof, by adding or removing a solvent, carrier, and/or diluent, by adding a filler or thixotroping agent, etc.

In certain embodiments when the first layer is at least partially solidified prior to printing the second composition, printing of the second composition to form the second layer occurs before the at least partially solidified first layer has reached a final solidified state, i.e., while the at least partially solidified first layer is still "green." As used herein, "green" encompasses a partial solidified and/or a partial cure but not a final solidified and/or cure state. The distinction between partial solidification and/or cure state and a final solidification and/or cure state is whether the partially solidified and/or cured layer can undergo further solidification, curing and/or crosslinking. Functional groups of the components of the first composition may be present even in the final solidified and/or cure state, but may remain unreacted due to steric hindrance or other factors.

In these embodiments, printing of the layers may be considered "wet-on-wet" such that the adjacent layers at least physically bond, and may also chemically bond, to one another. For example, in certain embodiments, depending on a selection of the compositions, components in each of the layers may chemically cross-link/cure across the print line. There may be certain advantages in having the cross-link network extend across the print line in relation to longevity, durability and appearance of the porous 3D silicone article. The layers may also be formed around one or more substructures that can provide support or another function of the porous 3D silicone article. In other embodiments, the compositions are not curable such that the layers are merely physically bonded to one another in the porous 3D silicone article.

When the layers are applied wet-on-wet, and/or when the layers are only partially solidified and/or partially cured, any iterative steps of exposing the layers to a curing and/or solidification condition may effect cure of more than just the previously printed layer. As noted above, because the cure may extend beyond or across the print line, and because a composite including the layers is typically subjected to the solidification condition, any other partially cured and/or solidified layers may also further, alternatively fully, cure and/or solidify upon a subsequent step of exposing the layers to a curing and/or solidification condition. By way of example, the method may comprise printing the second composition to form the second layer on the at least partially solidified first layer. Prior to printing another composition to form another layer on the second layer, the second layer may be exposed to a solidification condition such that printing another composition to form another layer on the second layer comprises printing another composition to form another layer on an at least partially solidified second layer. However, in such an embodiment, exposing the second layer to the solidification condition may, depending on the selection of the first and second compositions, also further cure and/or solidify the at least partially solidified first layer. The same is true for any additional or subsequent layers The layers can each be of various dimension, including thickness and width. Thickness and/or width tolerances of the layers may depend on the 3D printing process used, with certain printing processes having high resolutions and others having low resolutions. Thicknesses of the layers can be uniform or may vary, and average thicknesses of the layers can be the same or different. Average thickness is generally associated with thickness of the layer immediately after printing. In various embodiments, the layers independently have an average thickness of from about 1 to about 10,000, about 2 to about 1,000, about 5 to about 750, about 10 to about 500, about 25 to about 250, or about 50 to 100, μm. Thinner and thicker thicknesses are also contemplated. This disclosure is not limited to any particular dimensions of any of the layers.

Alternatively or in addition, as introduced above, the layers, or any one layer, may have a configuration other than a traditional layer or film. For example, in certain embodiments, the first layer comprises a first filament and the second layer comprises a second filament, or only one of the first and second layers comprises a filament. Each of the first and second filaments may comprise a single filament or a plurality of filaments. The first and second filaments are referred to herein as the first filament and the second filament, respectively, which extends to and encompasses each of the first and second non-linear filaments independently comprising a single filament or a plurality of filaments, which may be independently selected and formed. Each of the first and second filaments may independently be randomized, linear, non-linear, patterned, woven, non-woven, continuous, discontinuous, or may have any other form or combinations of forms. For example, each of the first and second filaments may independently be a mat, a web, or have other orientations. Each of the first and second filaments independently may be patterned, for example in a nonintersecting manner or via parallel filaments or strands spaced from one another. Alternatively, the first and/or second filaments may intersect with themselves or with one another. The pattern or cross-hatching of the first and/or second filament may present perpendicular angles, or acute/obtuse angles, or combinations thereof, at each intersecting point of the first filament with itself or with the second filament, which orientation may be independently selected at each intersecting point. In certain embodiments, the first layer or the first filament comprises a first non-linear filament and the second layer or the second layer comprises a second non-linear filament. The first and second non-linear filaments may be randomized. In other embodiments, the first and second non-linear filaments are the same as and continuous with one another. For example, in this embodiment, the porous 3D silicone article may comprise a single filament or strand, which may be patterned or randomized. In these embodiments, the first and second layers are not separate or discrete from one another.

Further still, and as introduced above, the first layer may comprise fused droplets formed from the first composition. In these or other embodiments, the second layer may comprise fused droplets formed from the second composition.

In addition, and as introduced above, the first layer may comprise fused powders formed from the first composition. In these or other embodiments, the second layer may comprise fused powders formed from the second composition.

Regardless of the form of the layers, e.g. whether the layers are films, filaments, fused droplets, fused powders, combinations thereof, or other forms, each of the layers may have a randomized and/or a selectively solidified pattern. The randomized and/or selectively solidified patterns may take any form and may define the plurality of voids in the porous 3D silicone article. Examples of selectively solidified patterns associated with filaments are set forth above with respect to the first layer. The fused droplets may contact one another, may be spaced from one another, may be at least partially overlapping, etc., in such selectively solidified patterns. Similarly, the fused powders may be independently sized and selected. The layers may also vary, such that the first layer comprises the first filament and the second layer comprises fused powders, etc. Moreover, a single layer, e.g. the first layer, may comprise a combination of different forms, for example may comprise both the first filament and fused droplets, which may be in contact with or spaced from one another.

If desired, inserts, which may have varying shape, dimension, and may comprise any suitable material, may be disposed or placed on or at least partially in any layer during the inventive method. For example, an insert may be utilized in between subsequent printing steps, and the insert may become integral with the porous 3D silicone article upon its formation. Alternatively, the insert may be removed at any step during the inventive method, e.g. to leave a cavity or for other functional or aesthetic purposes. The use of such inserts may provide better aesthetics and economics over relying on printing alone.

Further, if desired, a composite including all or some of the layers may be subjected to a final solidification step, which may be a final cure step. For example, to ensure that the porous 3D silicone article is at a desired solidification state, a composite formed by printing and at least partially solidifying the layers may be subjected to a further step of solidification or further steps of solidification where layers may solidify under different types of solidification conditions. The final solidification step, if desired, may be the same as or different from any prior solidification steps, e.g. iterative solidification steps associated with each or any layer.

The total number of layers required will depend, for example, on the size and shape of the porous 3D silicone article, as well as dimensions of the individual and collective layers. One of ordinary skill can readily determine how many layers are required or desired using conventional techniques, such as 3D scanning, rendering, modeling (e.g. parametric and/or vector based modeling), sculpting, designing, slicing, manufacturing and/or printing software. In certain embodiments, once the porous 3D silicone article is in a final solidified or cured state, the individual layers may not be identifiable.

In various embodiments, the 3D printer is selected from a fused filament fabrication printer, a fused deposition modeling printer, a direct ink deposition printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

The 3D printer may be independently selected during each printing step associated with the inventive method. Said differently, if desired, each printing step may utilize a different 3D printer. Different 3D printers may be utilized to impart different characteristics with respect to the layers, and different 3D printers may be particularly well suited for different types of compositions.

As noted above, the porous 3D silicone article defines a plurality of voids. The voids may be external, i.e., defined by an exterior surface of the porous 3D silicone article, and/or internal, i.e., defined by an interior volume of the porous 3D silicone article. Typically, the voids are both external and internal.

Aspects of the voids are typically dictated by the desired end use application of the porous 3D silicone article. For example, the porous 3D silicone article may be referred to as a foam in view of the voids defined by the porous 3D silicone article. The porous 3D silicone article may be an open-celled foam and/or a closed-cell foam. The porous 3D silicone article may be compressible and/or rigid.

The voids may be of any shape, size, configuration, and concentration, which properties may vary with respect to each individual void.

The voids may be defined or imparted via various techniques. For example, the voids may be imparted during the inventive method in connection with printing steps. The compositions may include and/or be exposed to a blowing agent, such as a chemical or physical blowing agent, prior to, during, and/or after printing each composition. As understood in the art, physical blowing agents may impart voids or pores associated with liquids or gasses of the physical blowing agents. In contrast, chemical blowing agents typically react with one or more components in a composition, with gas production being a byproduct that may impart voids.

Alternatively or in addition, the voids may be formed from printing itself. For example, when the first and second layers comprise the first and second filaments, or the first and second non-linear filaments, respectively, the plurality of voids may be defined by at least the first and second filaments. The same is true for additional layers and additional filaments, i.e., the voids may be defined by the filaments of each individual layer and/or at the interface of adjacent layers. At least one of the layers does not consist of, but may otherwise comprise, linear filaments.

When the first layer comprises fused droplets formed from the first composition and the second layer comprises fused droplets formed from the second composition, the plurality of voids may be defined by at least deposition patterns of the fused droplets of the first and second layers. The same is true for additional layers and additional fused droplets, i.e., the voids may be defined by the fused droplets of each individual layer and/or at the interface of adjacent layers.

When the first layer comprises fused powders formed from the first composition and the second layer comprises fused powders formed from the second composition, the plurality of voids may be defined by at least deposition patterns of the fused powders of the first and second layers. The same is true for additional layers and additional fused powders, i.e., the voids may be defined by the fused powders of each individual layer and/or at the interface of adjacent layers.

When the first layer comprises a selectively solidified pattern formed from the first composition and the second layer comprises a selectively solidified pattern formed from the second composition, the plurality of voids may be defined by at least by solidification patterns of the selectively solidified patterns of the first and second layers. The same is true for additional layers and additional selectively solidified patterns, i.e., the voids may be defined by the selectively solidified patterns of each individual layer and/or at the interface of adjacent layers.

Because the layers are independently selected, the voids may also be defined by other combinations of features. For example, the first layer may comprise fused droplets formed from the first composition, and the second layer may comprise fused powders formed from the second composition, whereby the voids are defined at least by deposition patterns of the fused droplets and fused powders, respectively. Such depositions patters may define both internal and external voids, i.e. voids internal to the porous 3D silicone article and at the external surface thereof.

Moreover, the voids may be customized depending on end use application of the porous 3D silicone article. When the voids are formed via printing, deposition patterns may be programmed into the 3D printer and utilized to selectively control the voids, including their location, shape and dimension. The voids may be concentrated within certain areas within the porous 3D silicone article, i.e., may be heterogeneously distributed, or may be homogenously distributed within or throughout the porous 3D silicone article.

In addition, voids may be formed subsequent to or contemporaneous with formation of the porous 3D silicone article. For example, in certain embodiments, the method prepares a 3D silicone article, and the method further comprises forming voids in the 3D silicone article to give the porous 3D silicone article. Alternatively, the method may prepare the porous 3D silicone article, and the method may further comprise forming additional voids in the porous 3D silicone article.

When the method comprises forming voids separate from those formed during printing, the voids may be formed via any suitable technique. Forming voids may be referred to as subtractive manufacturing process. Suitable subtractive manufacturing processes are generally contingent on the types of layers, the particular compositions utilized, etc.

For example, the voids may be formed mechanically, e.g. by inserting a rod or object into 3D silicone article or porous 3D silicone article to form voids. Alternatively or in addition, the voids may be formed by selectively etching portions of the 3D silicone article, or the porous 3D silicone article, to form voids. As understood in the art, selectively etching typically involves use of an etching material, which may be selectively applied or disposed on the 3D silicone article, or the porous 3D silicone article, to remove, or etch, portions thereof to leave voids. The etching material may be any suitable etching material contingent on the layers and their properties. For example, the etching material may be a solvent, which solubilizes and removes portions of the 3D silicone article, or the porous 3D silicone article.

Alternatively or in addition, the method may comprise exposing the layers, the 3D silicone article, and/or the porous 3D silicone article to the solidification condition to selectively solidify potions thereof to form voids. The selective application of the solidification condition also is typically based on the layers and the particular compositions utilized. For example, the selective application of the solidification condition may rely on use of a photomask and selective irradiation of a layer to selectively cure portions thereof, e.g. if the layer is radiation-curable. The uncured portions may then be removed, e.g. via etching, solvent, or other methods. Alternatively, the selective application of the solidification condition may rely on selective heat application, e.g. if the layer is heat-curable. Alternatively, the selective application of the solidification condition may include subjecting particular portions of a layer to radiation and/or heat to depolymerize those portions. The depolymerized portions may then be removed, e.g. via etching, solvent, or other methods, to form voids.

The average size of the voids may vary based on many factors, including desired end use applications of the porous 3D silicone article, the compositions utilized, the technique utilized for forming the voids, etc.

The average sizes of the voids depend on the need for particular applications and may range from several Angstroms to several tens of centimeters. Void spaces larger than about a few micrometers in size can be directly printed or formed by physical and/or chemical blowing agents, which are selected based on the particular composition(s) utilized. Physical blowing agents can include, but are not limited to, air, nitrogen, carbon dioxide, and other gases. Chemical blowing agents can include, but are not limited to, silicone hydride compounds with water or silicon hydroxide compounds. Various techniques to incorporate voids of smaller sizes (micro and meso pores) may also be utilized, and include but are not limited to using siloxane cage structures, highly crosslinked siloxane or organic structures, or incorporating pre-formed materials containing pores of such sizes. Alternatively various portions in the three dimensional object can be removed by physical or chemical etching processes to form voids of different sizes.

With reference to the Figures, a porous 3D silicone article formed in accordance with the method is shown.

By way of example, a porous 3D silicone article formed in accordance with one embodiment of the method is shown generally at 10 in FIG. 1. The porous 3D silicone article defines a plurality of voids 12.

Figure 2:
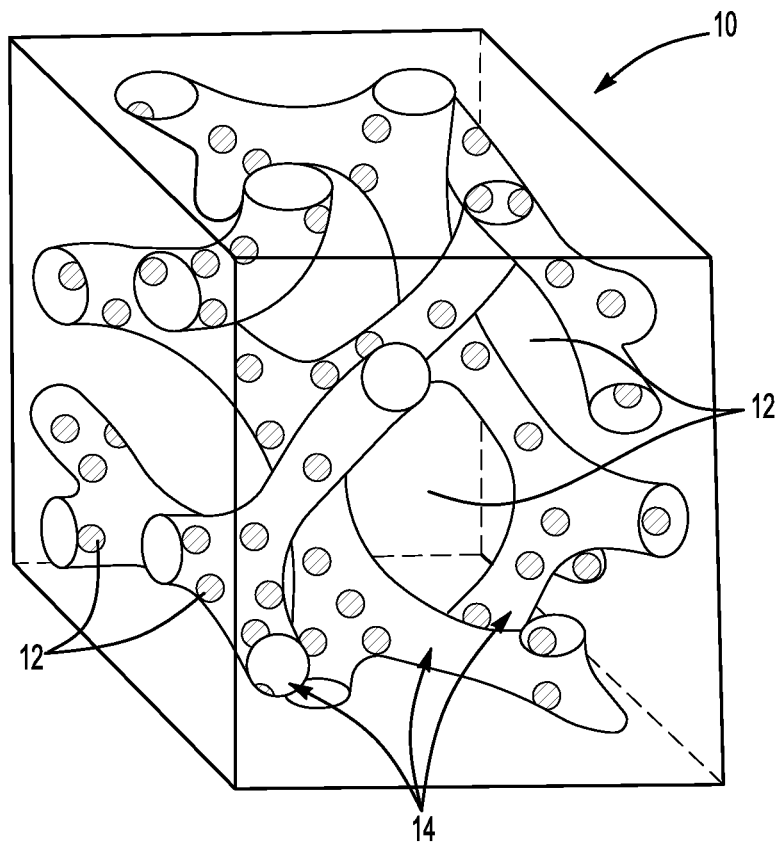
FIG. 2 is a schematic view of a unit cell of a porous 3D article formed via one embodiment of the inventive method.

FIG. 2 shows a unit cell of the porous 3D silicone 10, as exemplified in FIG. 1, further comprising a plurality of filaments 14. More specifically, FIG. 2 shows the porous 3D silicone article 10 comprising the plurality of filaments 14 in a randomized solidified pattern. The plurality of filaments 14 define the plurality of voids 12.

Figure 3:
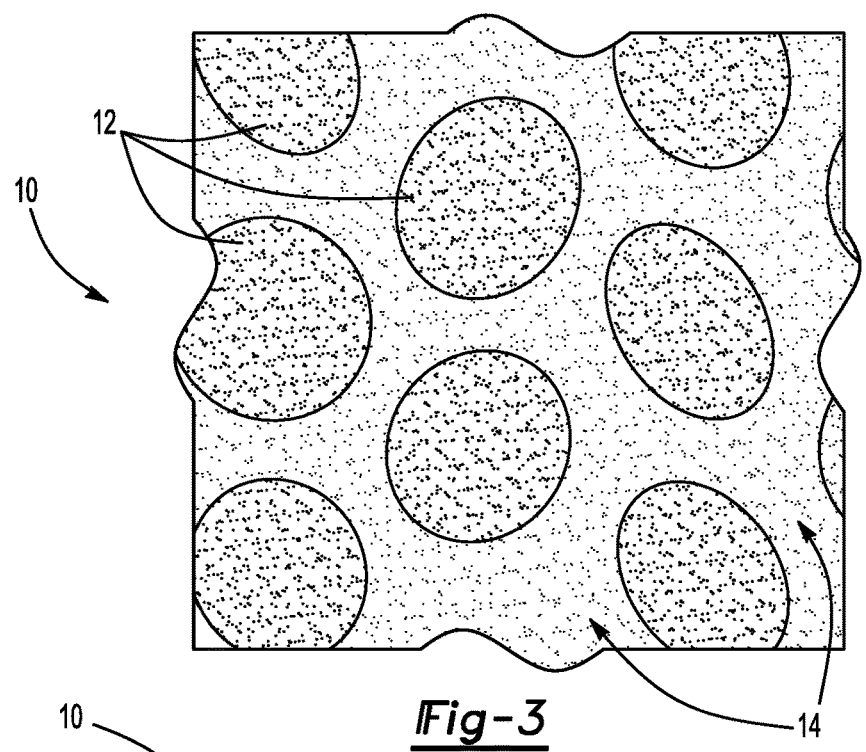
FIG. 3 is a schematic view of a cross section of a porous 3D article formed via a further embodiment of the inventive method.

FIG. 3 shows a cross section of the porous 3D silicone article 10, as exemplified in FIG. 1. In particular, FIG. 3 shows the porous 3D silicone article 10 comprising the plurality of filaments 14 in a selectively solidified pattern. The plurality of filaments 14 define the plurality of voids 12.

Figure 4:
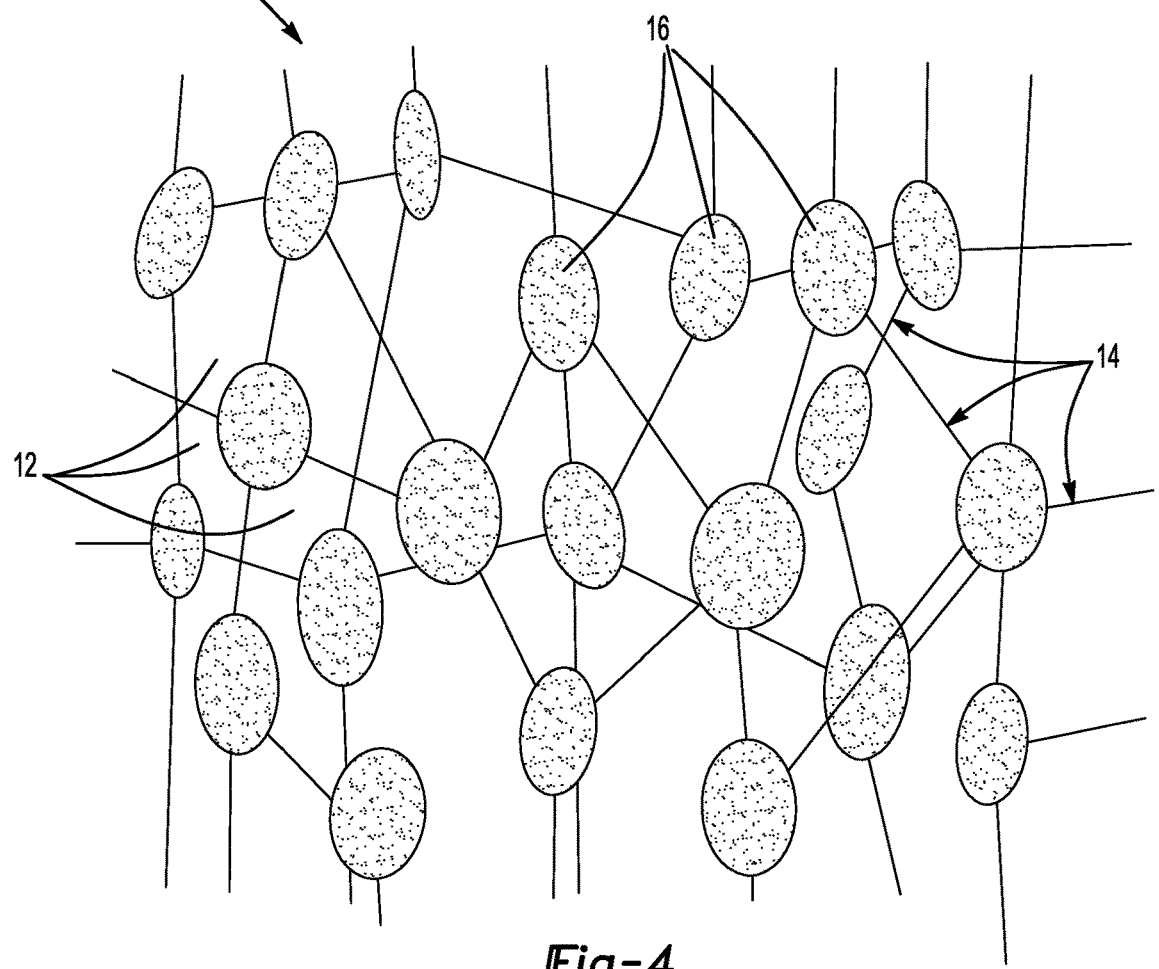
FIG. 4 is a schematic view of an expanded portion of a porous 3D article formed via yet another embodiment of the inventive method.

FIG. 4 shows another view of the porous 3D silicone article 10, as exemplified in FIG. 1, further comprising fused droplets 16. More specifically, FIG. 4 shows the porous 3D silicone article 10 comprising the fused droplets 16 in a randomized solidified pattern linked by the plurality of filaments 14. The plurality of voids 12 are defined by deposition patterns of the fused droplets 16, as well as by the plurality of filaments 14.

The porous 3D silicone article has myriad end use applications in view of the customization thereof, including with respect to the voids. For example, as noted above, the porous 3D silicone article may be a compressible foam, or may be a rigid foam. The porous 3D silicone article may be utilized in any application in which a foam is desired, and may be utilized in lieu of conventional polyurethane foams.

For example, foams have numerous end use applications, including cushion and support articles (e.g. furniture) and clothing (e.g. comfort wear, human body impact protection, insulation, etc.). Foams may also be utilized in noise, vibration and harshness (NVH) applications, e.g. in transportation applications (vehicles, trains, planes, ships, etc.). Further, foams may be utilized in or as airtight retaining gaskets architectural members or elements, refractory gaskets, sealing materials, O-rings, copier rolls, air dampening applications, acoustic applications, and other applications. In addition, in view of the excellent compatibility between silicones and biological systems, the porous 3D silicone article may also be utilized in health care applications, e.g. internal or external to a body of a mammal, such as a human. Other particular uses and applications for the porous 3D silicone article include for/as drug delivery vehicles, separation membranes, selective substance adsorbents, absorbers, and/or filters (e.g. for water and/or soil purification and clean up), fire proofing/retarding materials, light diffusers, reaction vessels, and armor.

The first and second compositions, and any subsequent or additional compositions utilized to print subsequent or additional layers, are independently selected and may be the same as or different from one another. As such, for purposes of clarity, reference below to "the composition" or "the compositions" is applicable to the first and/or second compositions, and any subsequent or additional compositions utilize to print subsequent or additional layers, and is not to be construed as requiring the compositions to be the same as one another.

At least one of the first and second compositions comprises a silicone composition. In some embodiments, the first composition comprises a first silicone composition. In these and other embodiments, the second composition may comprise a second silicone composition. In certain embodiments, the second composition comprises the second silicone composition. Moreover, any subsequent or additional compositions utilized to print subsequent or additional layers, may also comprise a silicone composition. Each of the silicone compositions utilized is independently selected and may be the same or different from one another. As such, for purposes of clarity, reference below to "the silicone composition" or "the silicone compositions" is applicable to the first and/or second silicone compositions, and any subsequent or additional silicone compositions present in the compositions utilized to print subsequent or additional layers, and is not to be construed as requiring the silicone compositions to be the same as one another.

In certain embodiments, the silicone compositions are independently selected from (a) hydrosilylation-curable silicone compositions; (b) condensation-curable silicone compositions; (c) thiol-ene reaction-curable silicone compositions; (d) free-radical-curable silicone compositions; and (e) ring-opening reaction-curable silicone compositions. In these embodiments, the silicone compositions are generally curable such that exposure to the solidification condition may be referred to as exposure to a curing condition. As understood in the art, these silicone compositions may be cured via different curing conditions, such as exposure to moisture, exposure to heat, exposure to irradiation, etc. Moreover, these silicone compositions may be curable upon exposure to different types of curing conditions, e.g. both heat and irradiation, which may be utilized together or as only one. In addition, exposure to a curing condition may cure or initiate cure of different types of silicone compositions. For example, heat may be utilized to cure or initiate cure of condensation-curable silicone compositions, hydrosilylation-curable silicone compositions, and free radical-curable silicone compositions.

The silicone compositions may have the same cure mechanism upon application of the curing condition, but may still be independently selected from one another. For example, the first silicone composition may comprise a condensation-curable silicone composition, and the second silicone composition may also comprise a condensation-curable silicone composition, wherein the condensation-curable silicone compositions differ from one another, e.g. by components, relative amounts thereof, etc.

In certain embodiments, each of the silicone compositions utilized in the method cures via the same cure mechanism upon application of the curing condition. These embodiments easily allow for cure across the print line, if desired, as the components of in each of the silicone compositions may readily react with one another in view of having the same cure mechanism upon application of the curing condition. In these embodiments, each of the silicone compositions may still differ from one another in terms of the actual components utilized and relative amounts thereof, even though the cure mechanism is the same in each of the silicone compositions. In contrast, although there may be some cure across the print line when each of the layers cures via a different mechanism (e.g. hydrosilylation versus condensation), components in these layers may not be able to react with one another upon application of the curing condition, which may be desirable in other applications.

In certain embodiments, at least one of the silicone compositions comprises a hydrosilylation-curable silicone composition. In these embodiments, the hydrosilylation-curable silicone composition typically comprises: (A) an organopolysiloxane having an average of at least two silicon-bonded alkenyl groups or silicon-bonded hydrogen atoms per molecule; (B) an organosilicon compound having an average of at least two silicon-bonded hydrogen atoms or silicon-bonded alkenyl groups per molecule capable of reacting with the silicon-bonded alkenyl groups or silicon-bonded hydrogen atoms in the organopolysiloxane (A); and (C) a hydrosilylation catalyst. When the organopolysiloxane (A) includes silicon-bonded alkenyl groups, the organosilicon compound (B) includes at least two silicon-bonded hydrogen atoms per molecule, and when the organopolysiloxane (A) includes silicon-bonded hydrogen atoms, the organosilicon compound (B) includes at least two silicon-bonded alkenyl groups per molecule. The organosilicon compound (B) may be referred to as a cross-linker or cross-linking agent.

The organopolysiloxane (A) and the organosilicon compound (B) may independently be linear, branched, cyclic, or resinous. In particular, the organopolysiloxane (A) and the organosilicon compound (B) may comprise any combination of M, D, T, and Q units. The symbols M, D, T, and Q represent the functionality of structural units of organopolysiloxanes. M represents the monofunctional unit $R^0{}_3SiO_{1/2}$. D represents the difunctional unit $R^0{}_2SiO_{2/2}$. T represents the trifunctional unit $R^0SiO_{3/2}$. Q represents the tetrafunctional unit $SiO_{4/2}$. Generic structural formulas of these units are shown below:

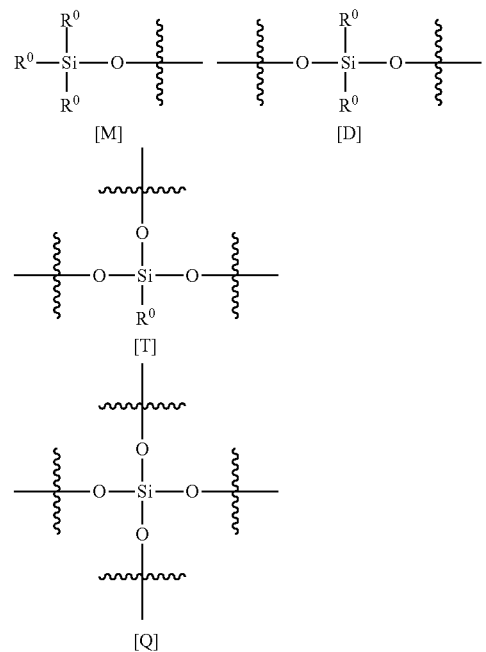

In these structures/formulae, each $R^0$ may be any hydrocarbon, aromatic, aliphatic, alkyl, alkenyl, or alkynl group.

The particular organopolysiloxane (A) and organosilicon compound (B) may be selected based on desired properties of the porous 3D silicone article and layers during the inventive method. For example, it may be desirable for the layers to be in the form of an elastomer, a gel, a resin, etc., and selecting the components of the silicone composition allows one of skill in the art to achieve a range of desirable properties.

For example, in certain embodiments, one of the organopolysiloxane (A) and the organosilicon compound (B) comprises a silicone resin, which typically comprises T and/or Q units in combination with M and/or D units. When the organopolysiloxane (A) and/or organosilicon compound (B) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting porous 3D silicone article have increased rigidity.

Alternatively, in other embodiments, the organopolysiloxane (A) and/or the organosilicon compound (B) is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting porous 3D silicone article are elastomeric.

The silicon-bonded alkenyl groups and silicon-bonded hydrogen atoms of the organopolysiloxane (A) and the organosilicon compound (B), respectively, may independently be pendent, terminal, or in both positions.

In a specific embodiment, the organopolysiloxane (A) has the general formula:

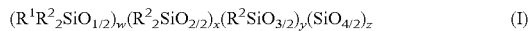

$$(R^1R^2_2SiO_{1/2})_w(R^2_2SiO_{2/2})_x(R^2SiO_{3/2})_y(SiO_{4/2})_z \qquad (I)$$

wherein each $R^1$ is an independently selected hydrocarbyl group, which may be substituted or unsubstituted, and each $R^2$ is independently selected from $R^1$ and an alkenyl group, with the proviso that at least two of $R^2$ are alkenyl groups, and w, x, y, and z are mole fractions such that w+x+y+z=1. As understood in the art, for linear organopolysiloxanes, subscripts y and z are generally 0, whereas for resins, subscripts y and/or z>0. Various alternative embodiments are described below with reference to w, x, y and z. In these embodiments, the subscript w may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x typically has a value of from 0 to 0.9, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

In certain embodiments, each $R^1$ is a $C_1$ to $C_{10}$ hydrocarbyl group, which may be substituted or unsubstituted, and which may include heteroatoms within the hydrocarbyl group, such as oxygen, nitrogen, sulfur, etc. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different within the organopolysiloxane (A), typically have from 2 to 10 carbon atoms, alternatively from 2 to 6 carbon atoms, and are exemplified by, for example, vinyl, allyl, butenyl, hexenyl, and octenyl.

In these embodiments, the organosilicon compound (B) may be further defined as an organohydrogensilane, an organopolysiloxane an organohydrogensiloxane, or a combination thereof. The structure of the organosilicon compound (B) can be linear, branched, cyclic, or resinous. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms. The organohydrogensilane can be a monosilane, disilane, trisilane, or polysilane.

Hydrosilylation catalyst (C) includes at least one hydrosilylation catalyst that promotes the reaction between the organopolysiloxane (A) and the organosilicon compound (B). The hydrosilylation catalyst (C) can be any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for (C) include the complexes of chloroplatinic acid and certain vinyl-containing organosiloxanes disclosed by Willing in U.S. Pat. No. 3,419,593, the portions of which address hydrosilylation catalysts are hereby incorporated by reference. A catalyst of this type is the reaction product of chloroplatinic acid and 1,3-diethenyl-1,1,3,3-tetramethyldisiloxane.

The hydrosilylation catalyst (C) can also be a supported hydrosilylation catalyst comprising a solid support having a platinum group metal on the surface thereof. A supported catalyst can be conveniently separated from organopolysiloxanes, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

In addition or alternatively, the hydrosilylation catalyst (C) can also be a microencapsulated platinum group metal-containing catalyst comprising a platinum group metal encapsulated in a thermoplastic resin. Hydrosilylation-curable silicone compositions including microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, complexing ligand, and thermoplastic resin.

The hydrosilylation catalyst (C) may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

Specific examples of photoactivatable hydrosilylation catalysts include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOC_6H_{11}]_4$, $Pt[p-CN—C_6H_4NNNOC_6H_{11}]_4$, $Pt[p-H_3COC_6H_4NNNOC_6H_{11}]_4$, $Pt[p-CH_3(CH_2)_x—C_6H_4NNNOCH_3]_4$, $1,5$-cyclooctadiene.$Pt[p-CN—C_6H_4NNNOC_6H_{11}]_2$, $1,5$-cyclooctadiene.$Pt[p-CH_3O—C_6H_4NNNOCH_3]_2$, $[(C_6H_6)_3P]_3Rh[p-CN—C_6H_4NNNOC_6H_{11}]$, and $Pd[p-CH_3(CH_2)_x—C_6H_4NNNOCH_3]_2$, where x is 1, 3, 5, 11, or 17; (η-diolefin) (σ-aryl)platinum complexes, such as ($\eta^4$-1,5-cyclooctadienyl)diphenylplatinum, $\eta^4$-1,3,5,7-cyclooctatetraenyl)diphenylplatinum, ($\eta^4$-2,5-norboradienyl)diphenylplatinum, ($\eta^4$-1,5-cyclooctadienyl)bis-(4-dimethylaminophenyl)platinum, ($\eta^4$-1,5-cyclooctadienyl)bis-(4-acetylphenyl)platinum, and ($\eta^4$-1,5-cyclooctadienyl)bis-(4-trifluormethylphenyl)platinum. Typically, the photoactivatable hydrosilylation catalyst is a Pt(II) β-diketonate complex and more typically the catalyst is platinum(II) bis(2,4-pentanedioate). The hydrosilylation catalyst (C) can be a single photoactivatable hydrosilylation catalyst or a mixture comprising two or more different photoactivatable hydrosilylation catalysts.

The concentration of the hydrosilylation catalyst (C) is sufficient to catalyze the addition reaction between the organopolysiloxane (A) and the organosilicon compound (B). In certain embodiments, the concentration of the hydrosilylation catalyst (C) is sufficient to provide typically from 0.1 to 1000 ppm of platinum group metal, alternatively from 0.5 to 100 ppm of platinum group metal, alternatively from 1 to 25 ppm of platinum group metal, based on the combined weight of the organopolysiloxane (A) and the organosilicon compound (B).

The hydrosilylation-curable silicone composition may be a two-part composition where the organopolysiloxane (A) and organosilicon compound (B) are in separate parts. In these embodiments, the hydrosilylation catalyst (C) may be present along with either or both of the organopolysiloxane (A) and organosilicon compound (B). Alternatively still, the hydrosilylation catalyst (C) may be separate from the organopolysiloxane (A) and organosilicon compound (B) in a third part such that the hydrosilylation reaction-curable silicone composition is a three-part composition.

In one specific embodiment the hydrosilylation-curable silicone composition comprises $ViMe_2(Me_2SiO)_{128}SiMe_2Vi$ as the organopolysiloxane (A), $Me_3SiO(Me_2SiO)_{14}(MeHSiO)_{16}SiMe_3$ as the organosilicon compound (B) and a complex of platinum with divinyltretramethyldisiloxane as (C) such that platinum is present in a concentration of 5 ppm based on (A), (B) and (C).

Solidification conditions for such hydrosilylation-curable silicone compositions may vary. For example, hydrosilylation-curable silicone composition may be solidified or cured upon exposure to irradiation and/or heat. One of skill in the art understands how selection of the hydrosilylation catalyst (C) impacts techniques for solidification and curing. In particular, photoactivatable hydrosilylation catalysts are typically utilized when curing via irradiation is desired.

In these or other embodiments, at least one of the silicone compositions comprises a condensation-curable silicone composition. In these embodiments, the condensation-curable silicone composition typically comprises (A') an organopolysiloxane having an average of at least two silicon-bonded hydroxyl or hydrolysable groups per molecule; optionally (B') an organosilicon compound having an average of at least two silicon-bonded hydrogen atoms, hydroxyl groups, or hydrolysable groups per molecule; and (C') a condensation catalyst. Although any parameter or condition may be selectively controlled during the inventive method or any individual step thereof, relative humidity and/or moisture content of ambient conditions may be selectively controlled to further impact a cure rate of condensation-curable silicone compositions.

The organopolysiloxane (A') and the organosilicon compound (B') may independently be linear, branched, cyclic, or resinous. In particular, the organopolysiloxane (A') and the organosilicon compound (B') may comprise any combination of M, D, T, and Q units, as with the organopolysiloxane (A') and the organosilicon compound (B') disclosed above.

The particular organopolysiloxane (A') and organosilicon compound (B') may be selected based on desired properties of the porous 3D silicone article and layers during the inventive method. For example, it may be desirable for the layers to be in the form of an elastomer, a gel, a resin, etc., and selecting the components of the silicone composition allows one of skill in the art to achieve a range of desirable properties.

For example, in certain embodiments, one of the organopolysiloxane (A') and the organosilicon compound (B') comprises a silicone resin, which typically comprises T and/or Q units in combination with M and/or D units. When the organopolysiloxane (A') and/or organosilicon compound (B') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the condensation-curable silicone composition comprises a resin, the layer(s) and resulting porous 3D silicone article have increased rigidity.

Alternatively, in other embodiments, the organopolysiloxane (A') and/or the organosilicon compound (B') is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting porous 3D silicone article are elastomeric.

The silicon-bonded hydroxyl groups and silicon-bonded hydrogen atoms, hydroxyl groups, or hydrolysable groups of the organopolysiloxane (A') and the organosilicon compound (B'), respectively, may independently be pendent, terminal, or in both positions.

As known in the art, silicon-bonded hydroxyl groups result from hydrolyzing silicon-bonded hydrolysable groups. These silicon-bonded hydroxyl groups may condense to form siloxane bonds with water as a byproduct.

Examples of hydrolysable groups include the following silicon-bonded groups: H, a halide group, an alkoxy group, an alkylamino group, a carboxy group, an alkyliminoxy group, an alkenyloxy group, or an N-alkylamido group. Alkylamino groups may be cyclic amino groups.

In a specific embodiment, the organopolysiloxane (A') has the general formula:

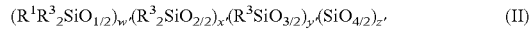
$$(R^1R^3_2SiO_{1/2})_{w'}(R^3_2SiO_{2/2})_{x'}(R^3SiO_{3/2})_{y'}(SiO_{4/2})_{z'}, \quad (II)$$

wherein each $R^1$ is defined above and each $R^3$ is independently selected from $R^1$ and a hydroxyl group, a hydrolysable group, or combinations thereof with the proviso that at least two of $R^3$ are hydroxyl groups, hydrolysable groups, or combinations thereof, and w', x', y', and z' are mole fractions such that w'+x'+y'+z'=1. As understood in the art, for linear organopolysiloxanes, subscripts y' and z' are generally 0, whereas for resins, subscripts y' and/or z'>0. Various alternative embodiments are described below with reference to w', x', y' and z'. In these embodiments, the subscript w' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x' typically has a value of from 0 to 0.9, alternatively from 0 to 0.45, alternatively from 0 to 0.25. The subscript y' typically has a value of from 0 to 0.99, alternatively from 0.25 to 0.8, alternatively from 0.5 to 0.8. The subscript z' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

As set forth above, the condensation-curable silicone composition further comprises the organosilicon compound (B'). The organosilicon compound (B') may be linear, branched, cyclic, or resinous. In one embodiment, the organosilicon compound (B') has the formula $R^1_qSiX_{4-q}$, wherein $R^1$ is defined above, X is a hydrolysable group, and q is 0 or 1.

Specific examples of organosilicon compounds (B') include alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O-N=C(CH_3)CH_2CH_3]_3$, $Si[O-N=C(CH_3)CH_2CH_3]_4$, and $CH_2=CHSi[O-N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]_3$ and $CH_3Si(NHC_6H_{11})_3$; and organoaminooxysilanes.

The organosilicon compound (B') can be a single silane or a mixture of two or more different silanes, each as described above. Also, methods of preparing tri- and tetra-functional silanes are well known in the art; many of these silanes are commercially available.

When present, the concentration of the organosilicon compound (B') in the condensation-curable silicone composition is sufficient to cure (cross-link) the organopolysiloxane (A'). The particular amount of the organosilicon compound (B') utilized depends on the desired extent of cure, which generally increases as the ratio of the number of moles of silicon-bonded hydrolysable groups in the organosilicon compound (B') to the number of moles of silicon-bonded hydroxy groups in the organopolysiloxane (A') increases. The optimum amount of the organosilicon compound (B') can be readily determined by routine experimentation.

The condensation catalyst (C') can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst ($C^1$) can be selected from tin(II) and tin(IV) compounds such as tin dilaurate, tin dioctoate, and tetrabutyl tin; and titanium compounds such as titanium tetrabutoxide.

When present, the concentration of the condensation catalyst (C') is typically from 0.1 to 10% (w/w), alternatively from 0.5 to 5% (w/w), alternatively from 1 to 3% (w/w), based on the total weight of the organopolysiloxane (A') in the condensation-curable silicone composition.

When the condensation-curable silicone composition includes the condensation catalyst (C'), the condensation-curable silicone composition is typically a two-part composition where the organopolysiloxane (A') and condensation catalyst (C') are in separate parts. In this embodiment, the organosilicon compound (B') is typically present along with the condensation catalyst (C'). Alternatively still, the condensation-curable silicone composition may be a three-part composition, where the organopolysiloxane (A'), the organosilicon compound (B') and condensation catalyst (C') are in separate parts.

Solidification conditions for such condensation-curable silicone compositions may vary. For example, condensation-curable silicone composition may be solidified or cured upon exposure to ambient conditions and/or heat, although heat is commonly utilized to accelerate solidification and curing.

In these or other embodiments, at least one of the silicone compositions comprises a free radical-curable silicone composition. In one embodiment, the free radical-curable silicone composition comprises (A'') an organopolysiloxane having an average of at least two silicon-bonded unsaturated groups and (C'') an organic peroxide.

The organopolysiloxane (A'') may be linear, branched, cyclic, or resinous. In particular, the organopolysiloxane (A'') may comprise any combination of M, D, T, and Q units, as with the organopolysiloxane (A') and the organosilicon compound (B') disclosed above.

The particular organopolysiloxane (A'') may be selected based on desired properties of the porous 3D silicone article and layers during the inventive method. For example, it may be desirable for the layers to be in the form of an elastomer, a gel, a resin, etc., and selecting the components of the silicone composition allows one of skill in the art to achieve a range of desirable properties.

For example, in certain embodiments, the organopolysiloxane (A'') comprises a silicone resin, which typically comprises T and/or Q units in combination with M and/or D units. When the organopolysiloxane (A'') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting porous 3D silicone article have increased rigidity.

Alternatively, in other embodiments, the organopolysiloxane (A") comprises repeating D units. Such organopolysiloxanes are substantially linear but may include some branching attributable to T and/or Q units. Alternatively, such organopolysiloxanes are linear. In these embodiments, the layer(s) and resulting porous 3D silicone article are elastomeric.

The silicon-bonded unsaturated groups of the organopolysiloxane (A") may be pendent, terminal, or in both positions. The silicon-bonded unsaturated groups may include ethylenic unsaturation in the form of double bonds and/or triple bonds. Exemplary examples of silicon-bonded unsaturated groups include silicon-bonded alkenyl groups and silicon-bonded alkynyl groups.

In a specific embodiment, the organopolysiloxane (A") has the general formula:

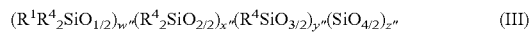  (III)

wherein each $R^1$ is defined above and each $R^4$ is independently selected from $R^1$ and an unsaturated group, with the proviso that at least two of $R^4$ are unsaturated groups, and w", x", y", and z" are mole fractions such that w"+x"+y"+z"=1. As understood in the art, for linear organopolysiloxanes, subscripts y" and z" are generally 0, whereas for resins, subscripts y" and/or z">0. Various alternative embodiments are described below with reference to w", x", y" and z". In these embodiments, the subscript w" may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x" typically has a value of from 0 to 0.9, alternatively from 0 to 0.45, alternatively from 0 to 0.25. The subscript y" typically has a value of from 0 to 0.99, alternatively from 0.25 to 0.8, alternatively from 0.5 to 0.8. The subscript z" typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The unsaturated groups represented by $R^4$ may be the same or different and are independently selected from alkenyl and alkynyl groups. The alkenyl groups represented by $R^4$, which may be the same or different, are as defined and exemplified in the description of $R^2$ above. The alkynyl groups represented by $R^4$, which may be the same or different, typically have from 2 to about 10 carbon atoms, alternatively from 2 to 8 carbon atoms, and are exemplified by, but are not limited to, ethynyl, propynyl, butynyl, hexynyl, and octynyl.

The free radical-curable silicone composition can further comprise an unsaturated compound selected from (i) at least one organosilicon compound having at least one silicon-bonded alkenyl group per molecule, (ii) at least one organic compound having at least one aliphatic carbon-carbon double bond per molecule, (iii) at least one organosilicon compound having at least one silicon-bonded acryloyl group per molecule; (iv) at least one organic compound having at least one acryloyl group per molecule; and (v) mixtures comprising (i), (ii), (iii) and (iv). The unsaturated compound can have a linear, branched, or cyclic structure.

The organosilicon compound (i) can be an organosilane or an organosiloxane. The organosilane can be a monosilane, disilane, trisilane, or polysilane. Similarly, the organosiloxane can be a disiloxane, trisiloxane, or polysiloxane. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded alkenyl group(s) can be located at terminal, pendant, or at both terminal and pendant positions.

Specific examples of organosilanes include, but are not limited to, silanes having the following formulae:

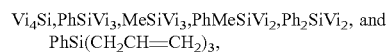

wherein Me is methyl, Ph is phenyl, and Vi is vinyl.

Specific examples of organosiloxanes include, but are not limited to, siloxanes having the following formulae:

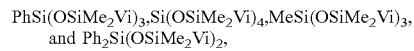

wherein Me is methyl, Vi is vinyl, and Ph is phenyl.

The organic compound can be any organic compound containing at least one aliphatic carbon-carbon double bond per molecule, provided the compound does not prevent the organopolysiloxane (A") from curing to form a silicone resin film. The organic compound can be an alkene, a diene, a triene, or a polyene. Further, in acyclic organic compounds, the carbon-carbon double bond(s) can be located at terminal, pendant, or at both terminal and pendant positions.

The organic compound can contain one or more functional groups other than the aliphatic carbon-carbon double bond. Examples of suitable functional groups include, but are not limited to, —O—, >C═O, —CHO, —CO$_2$, —C≡N, —NO$_2$, >C═C<, —C≡C—, —F, —Cl, —Br, and —I. The suitability of a particular unsaturated organic compound for use in the free-radical curable silicone composition of the present invention can be readily determined by routine experimentation.

Examples of organic compounds containing aliphatic carbon-carbon double bonds include, but are not limited to, 1,4-divinylbenzene, 1,3-hexadienylbenzene, and 1,2-diethenylcyclobutane.

The unsaturated compound can be a single unsaturated compound or a mixture comprising two or more different unsaturated compounds, each as described above. For example, the unsaturated compound can be a single organosilane, a mixture of two different organosilanes, a single organosiloxane, a mixture of two different organosiloxanes, a mixture of an organosilane and an organosiloxane, a single organic compound, a mixture of two different organic compounds, a mixture of an organosilane and an organic compound, or a mixture of an organosiloxane and an organic compound.

The organic peroxide (C") is utilized as a free radical initiator to initiate polymerization of the organopolysiloxane (A"). Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aryl peroxides such as t-butyl perbenzoate, t-butyl peracetate, and t-butyl peroctoate.

The organic peroxide (C") can be a single peroxide or a mixture comprising two or more different organic peroxides. The concentration of the organic peroxide is typically from 0.1 to 5% (w/w), alternatively from 0.2 to 2% (w/w), based on the weight of the organopolysiloxane (A").

The free radical-curable silicone composition may be a two-part composition where the organopolysiloxane (A") and organic peroxide (C") are in separate parts.

In these or other embodiments, at least one of the silicone compositions comprises a ring opening reaction-curable silicone composition. In various embodiments, the ring opening reaction-curable silicone composition comprises (A''') an organopolysiloxane having an average of at least two epoxy-substituted groups per molecule and (C''') a curing agent. However, the ring opening reaction-curable silicone composition is not limited specifically to epoxy-functional organopolysiloxanes. Other examples of ring opening reaction-curable silicone compositions include those comprising silacyclobutane and/or benzocyclobutene.

The organopolysiloxane (A''') may be linear, branched, cyclic, or resinous. In particular, the organopolysiloxane (A''') may comprise any combination of M, D, T, and Q units, as with the organopolysiloxane (A') and the organosilicon compound (B') disclosed above.

The particular organopolysiloxane (A''') may be selected based on desired properties of the porous 3D silicone article and layers during the inventive method. For example, it may be desirable for the layers to be in the form of an elastomer, a gel, a resin, etc., and selecting the components of the silicone composition allows one of skill in the art to achieve a range of desirable properties.

For example, in certain embodiments, the organopolysiloxane (A''') comprises a silicone resin, which typically comprises T and/or Q units in combination with M and/or D units. When the organopolysiloxane (A''') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting porous 3D silicone article have increased rigidity.

Alternatively, in other embodiments, the organopolysiloxane (A''') comprises repeating D units. Such organopolysiloxanes are substantially linear but may include some branching attributable to T and/or Q units. Alternatively, such organopolysiloxanes are linear. In these embodiments, the layer(s) and resulting porous 3D silicone article are elastomeric.

The epoxy-substituted groups of the organopolysiloxane (A''') may be pendent, terminal, or in both positions. "Epoxy-substituted groups" are generally monovalent organic groups in which an oxygen atom, the epoxy substituent, is directly attached to two adjacent carbon atoms of a carbon chain or ring system. Examples of epoxy-substituted organic groups include, but are not limited to, 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3 epoxycylopentyl)propyl.

In a specific embodiment, the organopolysiloxane (A''') has the general formula:

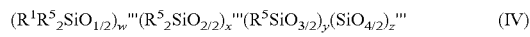

$(R^1R^5{}_2SiO_{1/2})_{w'''}(R^5{}_2SiO_{2/2})_{x'''}(R^5SiO_{3/2})_{y'''}(SiO_{4/2})_{z'''}$     (IV)

wherein each $R^1$ is defined above and each $R^5$ is independently selected from $R^1$ and an epoxy-substituted group, with the proviso that at least two of $R^5$ are epoxy-substituted groups, and w''', x''', y''', and z''' are mole fractions such that w'''+x'''+y'''+z'''=1. As understood in the art, for linear organopolysiloxanes, subscripts y''' and z''' are generally 0, whereas for resins, subscripts y''' and/or z'''>0. Various alternative embodiments are described below with reference to w''', x''', y''' and z'''. In these embodiments, the subscript w''' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99, The subscript x''' typically has a value of from 0 to 0.9, alternatively from 0 to 0.45, alternatively from 0 to 0.25. The subscript y''' typically has a value of from 0 to 0.99, alternatively from 0.25 to 0.8, alternatively from 0.5 to 0.8. The subscript z''' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The curing agent (C''') can be any curing agent suitable for curing the organopolysiloxane (A'''). Examples of curing agents (C''') suitable for that purpose include phenolic compounds, carboxylic acid compounds, acid anhydrides, amine compounds, compounds containing alkoxy groups, compounds containing hydroxyl groups, or mixtures thereof or partial reaction products thereof. More specifically, examples of curing agents (C''') include tertiary amine compounds, such as imidazole; quaternary amine compounds; phosphorus compounds, such as phosphine; aluminum compounds, such as organic aluminum compounds; and zirconium compounds, such as organic zirconium compounds. Furthermore, either a curing agent or curing catalyst or a combination of a curing agent and a curing catalyst can be used as the curing agent (C'''). The curing agent (C''') can also be a photoacid or photoacid generating compound.

The ratio of the curing agent (C''') to the organopolysiloxane (A''') is not limited. In certain embodiments, this ratio is from 0.1-500 parts by weight of the curing agent (C''') per 100 parts by weight of the organopolysiloxane (A''').

Solidification conditions for such free radical-curable silicone compositions may vary. Typically, heat is utilized.

In other embodiments, at least one of the silicone compositions comprises a thiol-ene curable silicone composition. In these embodiments, the thiol-ene curable silicone composition typically comprises: (A'''') an organopolysiloxane having an average of at least two silicon-bonded alkenyl groups or silicon-bonded mercapto-alkyl groups per molecule; (B'''') an organosilicon compound having an average of at least two silicon-bonded mercapto-alkyl groups or silicon-bonded alkenyl groups per molecule capable of reacting with the silicon-bonded alkenyl groups or silicon-bonded mercapto-alkyl groups in the organopolysiloxane (A''''); (C'''') a catalyst; and, optionally, (D'''') an organic compound containing two or more mercapto groups. When the organopolysiloxane (A'''') includes silicon-bonded alkenyl groups, the organosilicon compound (B'''') and/or the organic compound (D'''') include at least two mercapto groups per molecule bonded to the silicon and/or in the organic compound, and when the organopolysiloxane (A'''') includes silicon-bonded mercapto groups, the organosilicon compound (B'''') includes at least two silicon-bonded alkenyl groups per molecule. The organosilicon compound (B'''') and/or the organic compound (D'''') may be referred to as a cross-linker or cross-linking agent.

The catalyst (C'''') can be any catalyst suitable for catalyzing a reaction between the organopolysiloxane (A'''') and the organosilicon compound (B'''') and/or the organic compound (D''''). Typically, the catalyst (C'''') is selected from: i) a free radical catalyst; ii) a nucleophilic reagent; and iii) a combination of i) and ii). Suitable free radical catalysts for use as the catalyst (C'''') include photo-activated free radical catalysts, heat-activated free radical catalysts, room temperature free radical catalysts such as redox catalysts and alkylborane catalysts, and combinations thereof. Suitable nucleophilic reagents for use as the catalyst (C"") include amines, phosphines, and combinations thereof.

In some embodiments, at least one of the silicone compositions comprises a silicon hydride-silanol reaction curable silicone composition. In such embodiments, the silicon hydride-silanol reaction curable silicone composition typically comprises: (A"") an organopolysiloxane having an average of at least two silicon-bonded hydrogen atoms or at least two silicone bonded hydroxyl groups per molecule; (B"") an organosilicon compound having an average of at least two silicon-bonded hydroxyl groups or at least two silicon bonded hydrogen atoms per molecule capable of reacting with the silicon-bonded hydrogen atoms or silicon-bonded hydroxyl groups in the organopolysiloxane (A""); (C"") a catalyst; and, optionally, (D"") an active hydrogen containing compound. When the organopolysiloxane (A"") includes silicon-bonded hydrogen atoms, the organosilicon compound (B"") and/or the organic compound (D"") include at least two hydroxyl groups per molecule bonded to the silicon and/or in the active hydrogen containing compound, and when the organopolysiloxane (A"") includes silicon-bonded hydroxyl groups, the organosilicon compound (B"") includes at least two silicon-bonded hydrogen atoms per molecule. The organosilicon compound (B"") and/or the organic compound (D"") may be referred to as a cross-linker or cross-linking agent.

Typically, the catalyst (C"") is selected from: i) a Group X metal-containing catalyst such as platinum; ii) a base such as metal hydroxide, amine, or phosphine; and iii) combinations thereof.

The first composition, second compositions, and/or any subsequent or additional compositions utilized to print subsequent or additional layers, may comprise an organic composition. As stated above, each of the compositions utilized is independently selected and may be the same or different from one another. Accordingly, for purposes of clarity, reference below to "the organic composition" or "the organic compositions" is applicable to any organic composition present in the first and/or second compositions, and/or any subsequent or additional compositions utilized to print subsequent or additional layers, and is not to be construed as requiring the organic compositions to be the same as one another.

In certain embodiments, the organic composition comprises a resin, such as a thermosetting and/or thermoplastic resin. Examples of suitable thermosetting and/or thermoplastic resins typically include epoxy, polyester, phenol, polyamide, polyimide, polyvinyl, polyvinyl ester (i.e., vinylester), and polyurethane resins, as well as modifications, and combinations thereof. Additionally, elastomers and/or rubbers can be added to or compounded with the uncured thermosetting and/or thermoplastic resin to improve certain properties such as impact strength.

Other specific examples of suitable thermosetting and/or thermoplastic resins include polyamides (PA); polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

In some embodiments the organic composition is an epoxy resin, which may be a thermosetting and/or thermoplastic epoxy resin. In such some embodiments, the epoxy resin comprises an epoxide-containing monomer (i.e., an "epoxide") and a curing agent.

Examples of suitable epoxides include aliphatic, aromatic, cyclic, acyclic, and polycyclic epoxides, and modifications and combinations thereof. The epoxide may be substituted or unsubstituted, and hydrophilic or hydrophobic. The epoxide may have an epoxy value (equiv./kg) of about 2 or greater, such as from about 2 to about 10, about 2 to about 8, about 2.5 to about 6.5, about 5 to about 10, about 2 to about 7, or about 4 to about 8. Specific examples of suitable epoxides include glyidyl ethers of biphenol A and bisphenol F, epoxy novolacs (such as epoxidized phenol formaldehydes), naphthalene epoxies, trigylcidyl adducts of p-aminophenol, tetraglycidyl amines of methylenedianiline, triglycidyl isocyanurates, hexahydro-o-phthalic acid-bis-glycidyl ester, hexahydro-m-phthalic acid-bis-glycidyl ester, hexahydro-p-phthalicacid-bis-glycidyl ester, and modifications and combinations thereof.

Examples of curing agents suitable for use in the epoxy resin include polyols, such as glycols and phenols. Particular examples of phenols include biphenol, bisphenol A, bisphenol F, tetrabromobisphenol A, dihydroxydiphenyl sulfone, phenolic oligomers obtained by the reaction of above mentioned phenols with formaldehyde, and combinations thereof. Additional examples of suitable curing agents include anhydride curing agents such as nadic methyl anhydride, methyl tetrahydrophthalic anhydride, and aromatic anhydrides such pyromellitic dianhydride, biphenyltetracarboxylic acid dianhydride, benzophenonetetracarboxylic acid dianhydride, oxydiphthalic acid dianhydride, 4,4'-(hexafluoroisopropylidene) diphthalic acid dianhydride, naphthalene tetracarboxylic acid dianhydrides, thiophene tetracarboxylic acid dianhydrides, 3,4,9,10-perylenetetracarboxylic acid dianhydrides, pyrazine tetracarboxylic acid dianhydrides, 3,4,7,8-anthraquinone tetracarboxylic acid dianhydrides, oligomers or polymers obtained by the copolymerization of maleic anhydride with ethylene, isobutylene, vinyl methyl ether, and styrene, and combinations thereof. Further examples of suitable curing agents include maleic anhydride-grafted polybutadiene.

In some embodiments the organic composition is a polyamide resin, which may be a thermosetting and/or thermoplastic polyamide resin. Examples of suitable polyamides include those formed by the reaction of a diamine monomer and a diacid crosslinker. Specific examples of such suitable polyamides include polycaproamide (Nylon 6), polyhexamethyleneadipamide (Nylon 66), polytetramethyleneadipamide (Nylon 46), poly hexamethylenesebacamide (Nylon 610), polyhexamethyl enedodecamide (Nylon 612), polyundecaneamide, poly dodecaneamide, hexamethyleneadipamide/caproamide copolymer (Nylon 66/6), caproamide/hexamethyleneterephthalamide copolymer (Nylon 6/6T), hexamethyleneadipamide/hexamethyleneterephthalamide copolymer (Nylon 66/6T) hexamethyleneadipamide/hexamethyleneisophthalamide copolymer (Nylon 66/6I), hexamethyleneadipamide/hexamethyleneisophthalamide/caproamide copolymer (Nylon 66/6I/6), hexamethyleneadipamide/hexamethylene terephthalamid/carpoamide copolymer (Nylon 66/6T/6), hexamethyleneterephthalamide/hexamethyleneisophthala mide copolymer (Nylon 6T/6I), hexamethyleneterephthalamide/dodecanamide copolymer (Nylon 6T/12), hexamethyleneadipamide/hexamethyleneterephthalamide/hexamethyleneisophthalamide copolymer (Nylon 66/6T/6I), polyxylyleneadipamide, hexamethyleneterephthalamide/2-methyl pentamethyleneterephthalamide copolymer, polymetaxylylenediamineadipamide (Nylon MXD6), polynonamethyleneterephthalamide (Nylon 9T), and combinations thereof.

In certain embodiments the organic composition is a phenol resin, which may be a thermosetting and/or thermoplastic phenol resin. Examples of suitable phenol resins include resins prepared by homopolymerizing or copolymerizing components containing at least a phenolic hydroxyl group, and optionally a cross-linker. In certain embodiments, the phenol resin is prepared without a cross-linker. Specific examples of suitable phenol resins include phenolic resins such as phenolnovolaks, cresolnovolaks, octylphenols, phenylphenols, naphtholnovolaks, phenolaralkyls, naphtholaralkyls, phenolresols, and the like, as well as modified phenolic resins such as alkylbenzene modified (especially, xylene modified) phenolic resins, cashew modified phenolic resins, terpene modified phenolic resins, and the like. Further examples of suitable phenol resins include 2,2-bis(4-hydroxyphenyl)propane (generally referred to as bisphenol A), 2,2-bis(4-hydroxyphenyl)methane, 1,1-bis(4-hydroxyphenyl)ethane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis(hydroxy-3-methylphenyl)propane, bis(4-hydroxyphenyl)sulfide, bis(4-hydroxy-phenyl)sulfone, hydroquinone, resorcinol, 4,6-dimethyl-2,4,6-tri(4-hydroxyphenyl)heptene, 2,4,6-dimethyl-2,4,6-tri(4-hydroxyphenyl)heptane, 2,6-dimethyl-2,4,6-tri(4-hydroxyphenyl)heptene, 1,3,5-tri(4-hydroxyphneyl)benzene, 1,1,1-tri(4-hydroxyphenyl) ethane, 3,3-bis(4-hydroxyaryl)oxyindole, 5-chloro-3,3-bis(4-hydroxyaryl)oxyindole, 5,7-dichloro-3,3-bis(4-hydroxyaryl) oxyindole, 5-brome-3,3-bis(4-hydroxyaryl) oxyindole, and combinations thereof.

In particular embodiments the organic composition is a polyester resin, which may be a thermosetting and/or thermoplastic polyester resin. Examples of suitable polyester resins include polycondensation products of a polycarboxylic acid and a polyol, ring-opened polymers of a cyclic lactone, polycondensation products of a hydroxycarboxylic acid, and polycondensation products of a dibasic acid and a polyol. It is to be appreciated that the term "polyol" as used herein is meant to describe a molecule with at least two —OH functional groups (e.g. alcohol, hydroxy and/or hydroxyl functional groups). Particular examples of suitable polyols include polyetherpolyols, diols such as glycols, triols such as glycerine, 1,2,6-hexanetriol, trimethoxypropane (TMP), and triethoxypropane (TEP), sugar alcohols such as erythtitol, lactitol, maltitol, mannitol, sorbitol, and xylitol, and the like, as well as combinations and modifications thereof. Other suitable polyols include biopolyols such as castor oil, hydroxylated fatty esters (e.g. hydroxylated glycerides), hydroxylated fatty acids, and the like, as well as modifications and/or combinations thereof. Specific examples of suitable polyester resins include polyethylene terephthalate resins, polypropylene terephthalate resins, polytrimethylene terephthalate resins, polybutylene terephthalate resins, polyethylene naphthalate resins, polybutylene naphthalate resins, polycyclohexanedimethylene terephthalate resins, polyethylene-1,2-bis(phenoxy) ethane-4,4'-dicarboxylate resins, polyethylene-1,2-bis(phenoxy)ethane-4,4'-dicarboxylate resins, as well as copolymer polyesters such as polyethylene isophthalate/terephthalate resins, polybutylene terephthalate/isophthalate resins, polybutylene terephthalate/decanedicarboxyate resins, and polycyclohexanedimethylene terephthalate/isophthalate resins, and combinations thereof.

In some embodiments the organic composition is a polyvinyl resin, which may be a thermosetting and/or thermoplastic polyvinyl resin. Examples of suitable polyvinyl resins include polymerization products of molecules comprising vinyl, vinylidene, and/or vinylene functional groups. Specific examples of polyvinyl resins include those formed from vinylhalides such as vinyl chloride, vinylarenes such as styrene, vinyl esters, and the like, as well as combinations and/or modifications thereof. Specific examples of suitable polyvinyl resins include polyvinyl ester resins, such as homopolymer, copolymer, and di-, tri-, and/or poly-block polymer products of vinyl esters. Examples of suitable vinyl esters include vinyl alkanoates such as vinyl acetates, vinyl stearates, vinyl decanoates, vinyl valerates, vinyl pivalate, and the like, vinyl benzoates, vinyl formates, vinyl cinnamates, and the like, as well as combinations and/or modifications thereof.

In certain embodiments, the organic composition is a polyurethane resin, which may be a thermosetting and/or thermoplastic polyurethane resin. Examples of suitable polyurethanes include condensation products of a polyisocyanate and a polyol, such as those polyols described herein. Examples of suitable polyisocyanates include diisocyanates such as aromatic diisocyanates (e.g. toluene diisocyanate (TDI), methylene diphenyl diisocyanate (MDI), and naphthalene diisocyanate (NDI)), alkylisocyanates (e.g. hexamethylene diisocyanate (HDI) and methylene bis-cyclohexylisocyanate (HMDI)), and aliphatic diisocyanates (e.g., isophorone diisocyanate (IPDI)), and the like, as well as combinations, modifications, and self-polymerization products thereof.

Any of the compositions may optionally and independently further comprise additional ingredients or components, especially if the ingredient or component does not prevent any particular component of the composition from curing. Examples of additional ingredients include, but are not limited to, fillers; inhibitors; adhesion promoters; dyes; pigments; anti-oxidants; carrier vehicles; heat stabilizers; flame retardants; thixotroping agents; flow control additives; fillers, including extending and reinforcing fillers; and cross-linking agents. In various embodiments, the composition further comprises ceramic powder. The amount of ceramic powder can vary and may depend on the 3D printing process being utilized.

One or more of the additives can be present as any suitable wt. % of the particular composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition.

In certain embodiments, the compositions are shear thinning. Compositions with shear thinning properties may be referred to as psuedoplastics. As understood in the art, compositions with shear thinning properties are characterized by having a viscosity which decreases upon an increased rate of shear strain. Said differently, viscosity and shear strain are inversely proportional for shear thinning compositions. When the compositions are shear thinning, the compositions are particularly well suited for printing, especially when a nozzle or other dispense mechanism is utilized. A specific example of a shear-thing composition comprising a silicone composition is XIAMETER® 9200 LSR, commercially available from Dow Corning Corporation of Midland, Mich.

Any of the compositions described above may be a single part or a multi-part composition, as described above with reference to certain compositions. Certain compositions are highly reactive such that multi-part compositions prevent premature mixing and curing of the components. The multi-part composition may be, for example, a two-part system, a three-part system, etc. contingent on the selection of the composition and the components thereof. Any component of the composition may be separate from and individually controlled with respect to the remaining components.

In certain embodiments, when the compositions are multi-part compositions, the separate parts of the multi-part composition may be mixed in a dispense printing nozzle, e.g. a dual dispense printing nozzle, prior to and/or during printing. Alternatively, the separate parts may be combined immediately prior to printing. Alternatively still, the separate parts may be combined after exiting the dispense printing nozzle, e.g. by crossing printing streams or by mixing the separate parts as the layers are formed.

The compositions can be of various viscosities. In certain embodiments, the composition has a viscosity less than 500, less than 250, or less than 100, centistokes at 25° C., alternatively a viscosity of from 1 to 1,000,000 centistokes at 25° C., alternatively from 1 to 100,000 centistokes at 25° C., alternatively from 1 to 10,000 centistokes at 25° C. Viscosity of each composition can be changed by altering the amounts and/or molecular weight of one or more components thereof. Viscosity may be adjusted to match components of the 3D printer, particularly any nozzle or dispensing mechanism, to control heat, speed or other parameters associated with printing. As readily understood in the art, kinematic viscosity may be measured in accordance with ASTM D-445 (2011), entitled "Standard Test Method for Kinematic Viscosity of Transparent and Opaque Liquids (and Calculation of Dynamic Viscosity)."

As will be appreciated from the disclosure herein, the compositions may be in any form suitable for printing and, subsequently, for solidification after printing. Accordingly, each composition utilized may independently be in a liquid, solid, or semi-solid form. For example, each composition may be utilized as a liquid suitable for forming streams and/or droplets, a powder, and/or a heat-meltable solid, depending on the particular composition and printing conditions selected and as described above.

When the solidification condition comprising heating, exposure to the solidification condition typically comprises heating the layer(s) at an elevated temperature for a period of time. The elevated temperature and the period of time may vary based on numerous factors, including the selection of the particular composition, a desired cross-link density of the at least partially solidified layer, dimensions of the layer(s), etc. In certain embodiments, the elevated temperature is from above room temperature to 300, alternatively from 30 to 250, alternatively from 40 to 200, alternatively from 50 to 150, ° C. In these or other embodiments, the period of time is from 0.001 to 600, alternatively from 0.04 to 60, alternatively from 0.1 to 10, alternatively from 0.1 to 5, alternatively from 0.2 to 2, minutes.

Any source of heat may be utilized for exposing the layer(s) to heat. For example, the source of heat may be a convection oven, rapid thermal processing, a hot bath, a hot plate, or radiant heat. Further, if desired, a heat mask or other similar device may be utilized for selective curing of the layer(s), as introduced above.

In certain embodiments, heating is selected from (i) conductive heating via a substrate on which the layer is printed; (ii) heating the composition via the 3D printer or a component thereof; (iii) infrared heating; (iv) radio frequency or micro-wave heating; (v) a heating bath with a heat transfer fluid; (vi) heating from an exothermic reaction of the composition; (vii) magnetic heating; (viii) oscillating electric field heating; and (ix) combinations thereof. When the method includes more than one heating step, e.g. in connection with each individual layer, each heating step is independently selected.

Such heating techniques are known in the art. For example, the heat transfer fluid is generally an inert fluid, e.g. water, which may surround and contact the layer as the composition is printed, thus initiating at least partial curing thereof. With respect to (ii) heating the composition via the 3D printer or a component thereof, any portion of the composition may be heated and combined with the remaining portion, or the composition may be heated in its entirety. For example, a portion (e.g. one component) of the composition may be heated, and, once combined with the remaining portion, the composition initiates curing. The combination of the heated portion and remaining portion may be before, during, and/or after the step of printing the composition. The components may be separately printed.

Alternatively or in addition, the solidification condition may be exposure to irradiation.

The energy source independently utilized for the irradiation may emit various wavelengths across the electromagnetic spectrum. In various embodiments, the energy source emits at least one of ultraviolet (UV) radiation, infrared (IR) radiation, visible light, X-rays, gamma rays, or electron beams (e-beam). One or more energy sources may be utilized.

In certain embodiments, the energy source emits at least UV radiation. In physics, UV radiation is traditionally divided into four regions: near (400-300 nm), middle (300-200 nm), far (200-100 nm), and extreme (below 100 nm). In biology, three conventional divisions have been observed for UV radiation: near (400-315 nm); actinic (315-200 nm); and vacuum (less than 200 nm). In specific embodiments, the energy source emits UV radiation, alternatively actinic radiation. The terms of UVA, UVB, and UVC are also common in industry to describe the different wavelength ranges of UV radiation.

In certain embodiments, the radiation utilized to cure the layer(s) may have wavelengths outside of the UV range. For example, visible light having a wavelength of from 400 nm to 800 nm can be used. As another example, IR radiation having a wavelength beyond 800 nm can be used.

In other embodiments, e-beam can be utilized to cure the layer(s). In these embodiments, the accelerating voltage can be from about 0.1 to about 10 MeV, the vacuum can be from about 10 to about $10^{-3}$ Pa, the electron current can be from about 0.0001 to about 1 ampere, and the power can vary from about 0.1 watt to about 1 kilowatt. The dose is typically from about 100 micro-coulomb/cm$^2$ to about 100 coulomb/cm$^2$, alternatively from about 1 to about 10 coulombs/cm$^2$. Depending on the voltage, the time of exposure is typically from about 10 seconds to 1 hour; however, shorter or longer exposure times may also be utilized.

Embodiment 1 relates to a method of forming a porous three-dimensional (3D) silicone article, said method comprising:

I) printing a first composition with a 3D printer to form a first layer from the first composition;

II) printing a second composition on the first layer with the 3D printer to form a second layer from the second composition on the first layer;

optionally, repeating step II) with independently selected composition(s) for any additional layer(s); and III) exposing the layers to a solidification condition;

wherein at least one of the first and second compositions comprises a silicone composition;

wherein at least one of the first and second layers does not consist of linear filaments; and wherein the porous three-dimensional (3D) silicone article defines a plurality of voids.

Embodiment 2 relates to the method of Embodiment 1, wherein: (i) the first layer comprises a first non-linear filament and the second layer comprises a second non-linear filament, and wherein the plurality of voids are defined by at least the first and second non-linear filaments; (ii) the first layer comprises a first non-linear filament and the second layer comprises a second non-linear filament, and wherein at least the first and second non-linear filaments are randomized; (iii) the first layer comprises a first non-linear filament and the second layer comprises a second non-linear filament, and wherein at least the first and second non-linear filaments are the same and continuous with one another; (iv) any combination of (i) to (iii); or (v) the first and second layers are non-filaments.

Embodiment 3 relates to the method of Embodiment 1, wherein: (i) the first layer comprises fused droplets formed from the first composition, the second layer comprises fused droplets formed from the second composition, and wherein the plurality of voids are defined by at least deposition patterns of the fused droplets of the first and second layers, respectively; (ii) the first layer comprises fused powders formed from the first composition, the second layer comprises fused powders formed form the second composition, and wherein the plurality of voids are defined by at least fusion patterns of the fused powders of the first and second layers, respectively; (iii) the first layer comprises a selectively solidified pattern, the second layer comprises a selectively solidified pattern, and wherein the plurality of voids are defined at least by solidification patterns of the selectively solidified patterns of the first and second layers, respectively; or (iv) a combination of (i) to (iii).

Embodiment 4 relates to the method of any one of Embodiments 1-3, wherein the method prepares a 3D silicone article, and the method further comprises forming voids in the 3D silicone article to provide the porous 3D silicone article.

Embodiment 5 relates to the method of Embodiment 4, wherein forming the voids in the 3D silicone article comprises: (i) selectively etching portions of the 3D silicone article to form the plurality of voids and give the porous 3D silicone article; (ii) exposing the layers to the solidification condition to selectively solidify potions of the 3D silicone article to form the plurality of voids and give the porous 3D silicone article; or (iii) both (i) and (ii).

Embodiment 6 relates to the method of any one of Embodiments 1-5, wherein: (i) the plurality of voids are open-celled; (ii) the plurality of voids are closed-celled; or (iii) a combination of (i) and (ii).

Embodiment 7 relates to the method of any one of Embodiments 1-6, wherein after I) the first layer is exposed to a solidification condition to give an at least partially solidified first layer such that II) is further defined as II) printing a second composition on the at least partially solidified first layer with the 3D printer to form a second layer on the at least partially solidified first layer.

Embodiment 8 relates to the method of any one of Embodiments 1-7, wherein the solidification condition is selected from: (i) exposure to moisture; (ii) exposure to heat; (iii) exposure to irradiation; (iv) reduced ambient temperature; (v) exposure to solvent; (vi) exposure to mechanical vibration; or (vii) any combination of (i) to (vi).

Embodiment 9 relates to the method of any one of Embodiments 1-8, wherein: (i) the first and second compositions are the same as one another; (ii) the first and second compositions are independently selected from (a) hydrosilylation-curable silicone compositions; (b) condensation-curable silicone compositions; (c) thiol-ene reaction-curable silicone compositions; (d) free-radical-curable silicone compositions; and (e) ring-opening reaction-curable silicone compositions; or (iii) both (i) and (ii).

Embodiment 10 relates to the method of any one of Embodiments 1-9, wherein the 3D printer is selected from a fused filament fabrication printer, a fused deposition modeling printer, a direct ink deposition printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

Embodiment 11 relates to the method of any one of Embodiments 1-10, wherein: (i) at least one of the plurality of voids is formed by a physical foaming method with a physical blowing agent; (ii) at least one of the plurality of voids is formed by a chemical foaming method with a chemical blowing agent; or (iii) both (i) and (ii).

Embodiment 12 relates to a porous three-dimensional (3D) silicone article formed in accordance with the method of any one of Embodiments 1-11.

Embodiment 13 relates to the use of the porous three-dimensional (3D) silicone article of Embodiment 12 for/as i) a drug delivery vehicle; ii) a seat cushion; iii) a human body impact protector; iv) a separation membrane; v) a selective substance absorber and/or filter; vi) a fire proofing/retarding material; vii) clothing; viii) a light diffuser; ix) a reaction vessel; and x) any combination of i) to ix).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A method of forming a porous three-dimensional (3D) silicone article, said method comprising:
    I) printing a first composition with a 3D printer to form a first layer from the first composition;
    II) printing a second composition on the first layer with the 3D printer to form a second layer from the second composition on the first layer;
    optionally, repeating step II) with independently selected composition(s) for any additional layer(s); and
    III) exposing the layers to a solidification condition;
    wherein at least one of the first and second compositions comprises a silicone composition selected from (a) hydrosilylation-curable silicone compositions; (b) condensation-curable silicone compositions; (c) thiol-ene reaction-curable silicone compositions; (d) free-radical-curable silicone compositions; and (e) ring-opening reaction-curable silicone compositions;
    wherein at least one of the first and second layers does not consist of linear filaments;
    wherein the porous three-dimensional (3D) silicone article defines a plurality of voids;
    wherein the first layer comprises a first non-linear filament and the second layer comprises a second non-linear filament, and wherein the plurality of voids are defined by at least the first and second non-linear filaments; or
    wherein: (i) the first layer comprises fused droplets formed from the first composition, the second layer comprises fused droplets formed from the second composition, and wherein the plurality of voids are defined by at least deposition patterns of the fused droplets of the first and second layers, respectively; (ii) the first layer comprises fused powders formed from the first composition, the second layer comprises fused powders formed form the second composition, and wherein the plurality of voids are defined by at least fusion patterns of the fused powders of the first and second layers, respectively; (iii) the first layer comprises a selectively solidified pattern, the second layer comprises a selectively solidified pattern, and wherein the plurality of voids are defined at least by solidification patterns of the selectively solidified patterns of the first and second layers, respectively; or (iv) a combination of (i) to (iii); or
    wherein the method prepares a 3D silicone article, and the method further comprises forming voids in the 3D silicone article to provide the porous 3D silicone article by (i) selectively etching portions of the 3D silicone article to form the plurality of voids and give the porous 3D silicone article; (ii) exposing the layers to the solidification condition to selectively solidify portions of the 3D silicone article to form the plurality of voids, thereby forming the porous 3D silicone article; or (iii) both (i) and (ii).

2. The method of claim 1, wherein: (i) the plurality of voids are open-celled; (ii) the plurality of voids are closed-celled; or (iii) a combination of (i) and (ii).

3. The method of claim 1, wherein after I) the first layer is exposed to a solidification condition to give an at least partially solidified first layer such that II) is further defined as II) printing a second composition on the at least partially solidified first layer with the 3D printer to form a second layer on the at least partially solidified first layer.

4. The method of claim 1, wherein the solidification condition is selected from: (i) exposure to moisture; (ii) exposure to heat; (iii) exposure to irradiation; (iv) reduced ambient temperature; (v) exposure to solvent; (vi) exposure to mechanical vibration; or (vii) any combination of (i) to (vi).

5. The method of claim 1, wherein the first and second compositions are the same as one another.

6. The method according to claim 1, wherein the 3D printer is selected from a fused filament fabrication printer, a fused deposition modeling printer, a direct ink deposition printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

* * * * *